Feb. 16, 1960

G. E. KELLY 2,924,896

PORTABLE FILM-TYPE BRAILLE READER

Filed June 2, 1958

Gerald E. Kelly
INVENTOR.

BY *Clarence A. O'Brien*
*and Harvey B. Jacobson*
Attorneys

Feb. 16, 1960  G. E. KELLY  2,924,896
PORTABLE FILM-TYPE BRAILLE READER
Filed June 2, 1958  3 Sheets-Sheet 2

Gerald E. Kelly
INVENTOR.

Feb. 16, 1960 G. E. KELLY 2,924,896
PORTABLE FILM-TYPE BRAILLE READER
Filed June 2, 1958 3 Sheets-Sheet 3
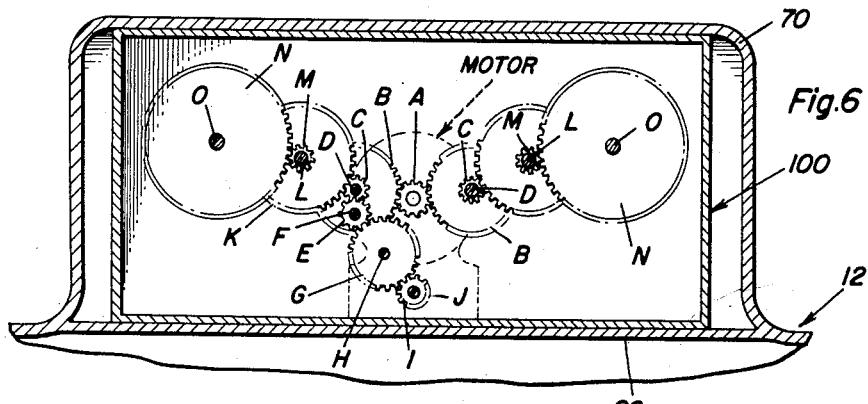
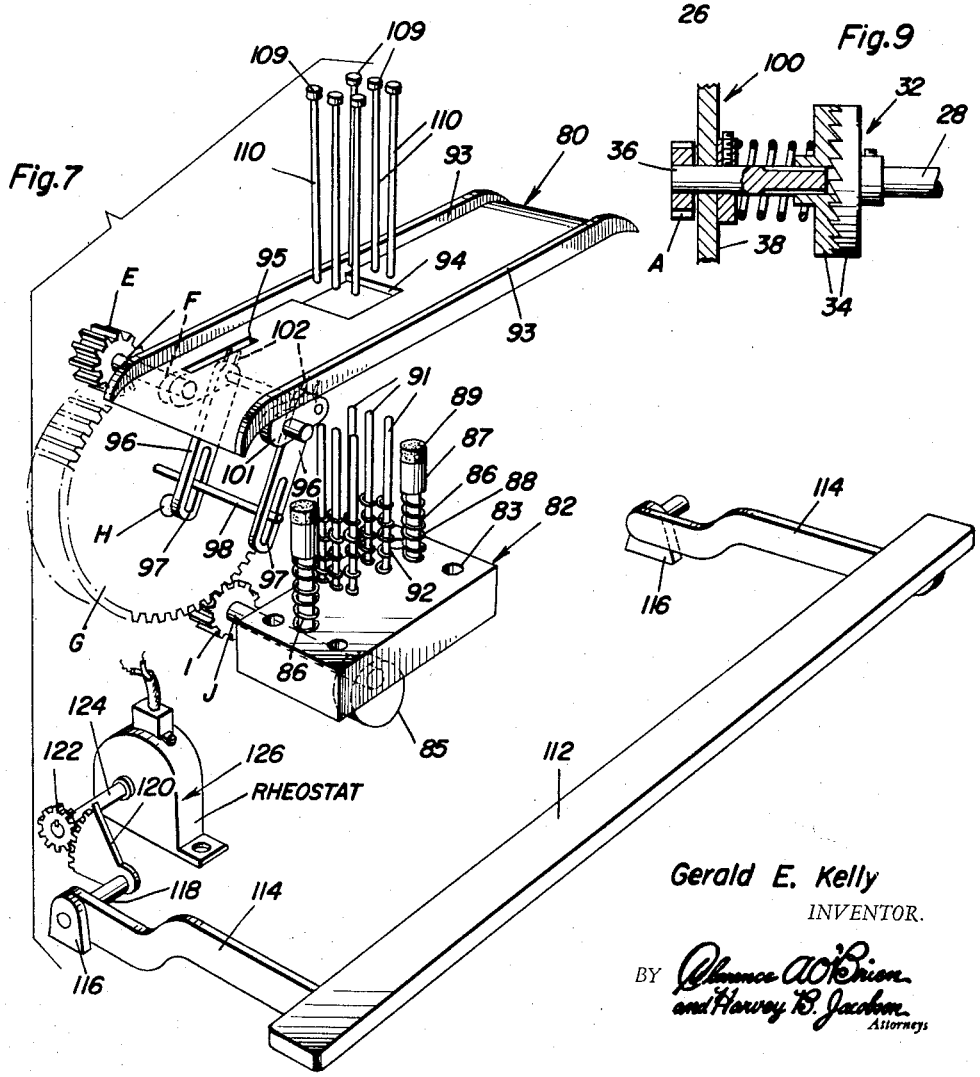
Gerald E. Kelly
INVENTOR.

United States Patent Office 2,924,896
Patented Feb. 16, 1960

2,924,896

PORTABLE FILM-TYPE BRAILLE READER

Gerald E. Kelly, North Highlands, Calif.

Application June 2, 1958, Serial No. 739,233

5 Claims. (Cl. 35—35)

The present invention relates to a Braille reader for the blind which is preferably, but not necessarily, in the form of a portable machine which is characterized by a readily accessible part which is herein referred to as a pedestal the upper end of which is provided with a convenient recessed head providing a finger rest. The finger supporting surface of the finger rest is provided with a plurality, usually six, of holes to accommodate button-like pads on the upper ends of a bank of projectible and retractible pins. These finger contacting and feeling pads are normally situated beneath and below the finger supporting surface of the finger rest. Actuating means which is under the control of the blind operator of the machine is incorporated in the case of the machine whereby the pads may be singly or collectively elevated just a fraction of an inch above the surface, said pads being usable in lieu of the customary raised embossments to present changeable readily readable Braille indicia.

The above general statements of the nature of the overall character of the invention have been presented just specifically enough to provide the reader with a general notion of the nature of the concept and the character of the machine is also characterized by an electric motor and ing the concept to practice. It is to be added here that the machine is also characterized by an electric motor and a specially perforated or prefabricated tape or film. Means is provided, similar to that in motion picture machines, for transporting the tape over a suitable platen constructed to accommodate the tape and other mechanisms to be revealed. The tape is carried by reels and is threaded into the machine so that the user by placing his finger atop the finger rest can receive impressions given by way of cooperation of the tape with the pins and pads.

In order to provide a sort of a background for the features and advantages and objectives, it is to be mentioned at the outset that your applicant has been informed that the Bible made in Braille consists of some twenty volumes, perhaps the size of Webster's Unabridged Dictionary. Consequently, and as a fairly rough estimate, it is believed that the material equivalent to that used in the Bible is capable of being appropriated for use in the instant machine and satisfactorily laid out on the film or tape, so to speak, using between twelve and fourteen 1000 ft. reels. Whereas, Braille books wear out because of constant fingering and use, the employment of a satisfactory film or tape as proposed here could be regarded as lasting almost indefinitely provided, of course, that the tape is given reasonable and proper care. It is submitted that a blind reader could read faster after having acquired skill following training with the use of the machine herein revealed. It is therefore an objective to provide a simple, practical and an easy-to-use and controllable machine for the blind which would enable one to read more books and with rapidity and comparative ease.

Another aspect of the concept as visualized by your applicant, is that the invention will prove out to be invaluable to one who is both deaf and blind where the only communication that he can get is with personal contact with another person. It is submitted that the invention, when fully perfected and developed, could well be adapted to school work where, for example, a teacher could give a lesson by the use of the tape for the individual to study. The fact is that the possibilities and range of usage of an invention such as that under consideration are extensive and need not be dwelled upon here. On the other hand, it is, perhaps, advisable, structurally speaking, to touch upon, in a preliminary way, certain features of the invention.

With the above end in view, it is to be pointed out that the aforementioned actuating control means is characterized, at least in part, by a power transported tape. This tape is moved over a platen from a full tape storage and supply reel to an empty take-up and winding reel. The tape has progressively usable suitably marked and systematically arranged frames, each having a prescribed group of holes capable of alternatively releasing and retaining spring-biased plungers in a bank of plungers which serve to operate the pads in a predetermined easy-to-feel and readily readable manner, this according to the training and skill of the operator.

In carrying out the invention, a tape or film approximating the size of an 8 mm. motion picture film will be employed. As will be brought out later, the usable surface of the tape or film will have characters put on one-half of the tape for running it in one direction and then the other half printed or prepared in the same manner so that the tape could be turned around and run back. There are two reasons for this, first by having the tape relatively wide it is stronger and secondly, being able to pull the tape allows for use of sprocket holes along the marginal edges and also by using a tape of this type, it is within reason to supply thirty-four words, more or less, to the foot of tape thus some thirty-four thousand words to a standard 1000 ft. roll of tape or film.

As will also be seen from the following description, the running of the tape through this machine can be compared to the procedure employed in using a similar type of film in a motion picture machine, the film being moved exactly one frame and stopped by intermittent means allowing the step-by-step presentation of information to be handled with ease, expediency and reliability.

Other objects, features and advantages will become more readily apparent from the following description and the accompanying sheets of illustrative, but not restrictive, drawings.

In the drawings wherein like numerals are employed to designate like components or parts throughout the views:

Fig. 6 is a view on an enlarged scale through the gear box showing the train of gearing.

Fig. 7 is an exploded perspective view in which most of the essential components appear in general operative relationship in respect to each other.

Fig. 9 is a view in section and elevation showing a portion of the motor drive shaft and pinion and clutch.

By way of introduction to the description of the details, it is to be pointed out that only sufficient of the seemingly necessary mechanical elements and expedients are herein disclosed to provide what is believed to be a complete operative portable film-type Braille reader or machine. Manifestly, in actual practice, many of the details will be changed and rearranged for which reason certain minor elements which might perhaps be thought to be missing, are being intentionally omitted to simplify the presentation of this disclosure.

Figure 1:
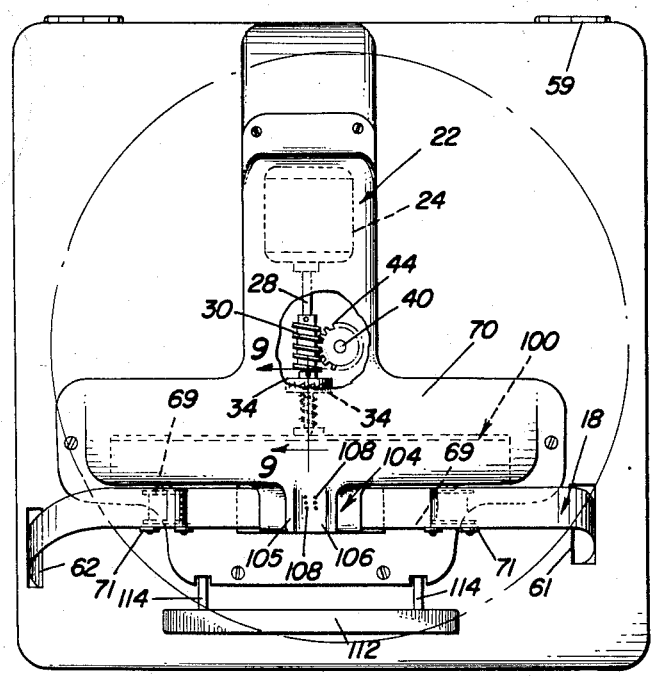
Fig. 1 is a top plan view of a portable film-type Braille reader or machine, constructed in accordance with the principles of the instant invention.
Figure 2:
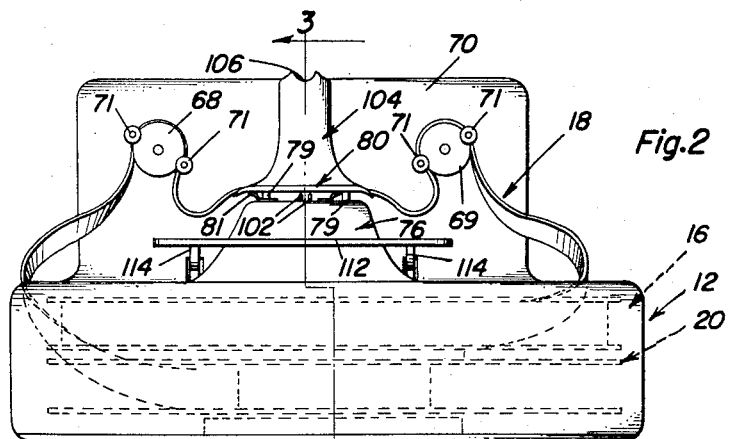
Fig. 2 is a front end elevation of the same.
Figure 3:
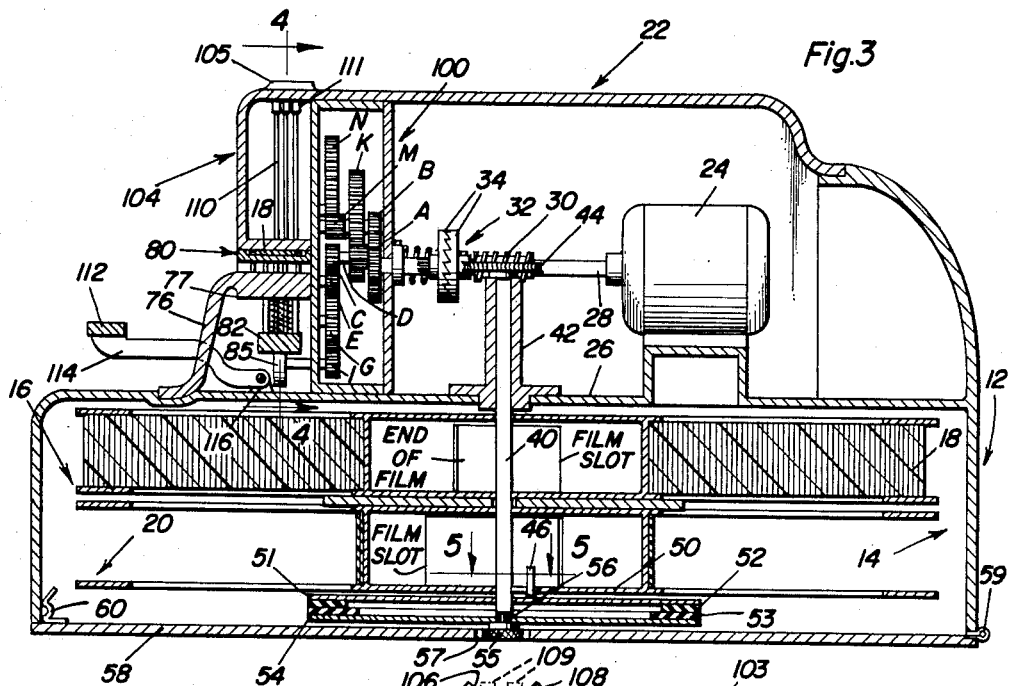
Fig. 3 is a view in section and elevation on an enlarged scale taken on the approximate vertical line 3—3 of Fig. 2, looking in the direction of the arrows.

With reference first to Figs. 1, 2, 3, 4 and 6, the case of the machine, which may be of suitable shape and materials, is, of course, variable. As seen in Fig. 1, the bottom portion of the case is denoted generally by the numeral 12 and this comprises a hollow base or storage space 14 which may be referred to broadly as a magazine for the two superposed reels; namely, the ready-to-use top reel 16 containing the tape or film 18 and the underlying take-up or empty reel 20. As to the central elevated motor housing and confined space, this part is denoted by the numeral 22. The electric motor 24 is suitably supported on the top or partitioning wall 26. The motor shaft 28 is provided with a worm 30 and a clutch 32 having cooperating clutch elements 34. As seen in Fig. 9 a stub shaft 36 extends through a bearing hole provided in a wall 38 and is provided with the main drive pinion A. Since, however, we are dealing at the moment with the reels, it will be evident that a vertical driven shaft 40, seen in Fig. 3, is mounted for rotation in a bearing 42 and is provided with a worm gear 44 in mesh with the worm 30. This shaft by way of a suitable key 46 (Fig. 5) and keying slot 48 serves to positively drive the reel 20 by way of a slotted wall 50. The keying pin 46 is mounted on an upper friction plate 51 having a friction ring 52 on its bottom side cooperating with a complemental ring 53 on the bottom friction clutch plate 54. These parts are assembled by way of an accessible nut 55, the lower part of the shaft 40 having a flat surface portion 56 which is keyed to the lower friction clutch plate 54. The nut 55 is accessible by way of a central hole 57 in the bottom door 58 of the magazine. The door is hingedly mounted in place at 59 and held closed by a suitable spring catch 60. As before stated, the magazine, reels, and drive may of course vary from that which is shown. Fig. 3 is illustrative of what is believed to be a satisfactory and acceptable film and reel magazine. As already mentioned, the supply of film or tape comes off of the loaded reel 16 and is reeled on the empty reel 20. The film is shown passing in a counter-clockwise direction in the drawing, and comes up at one end through a slot 61 and returns to the empty reel by way of slot 62 at the other end.

Figure 8:
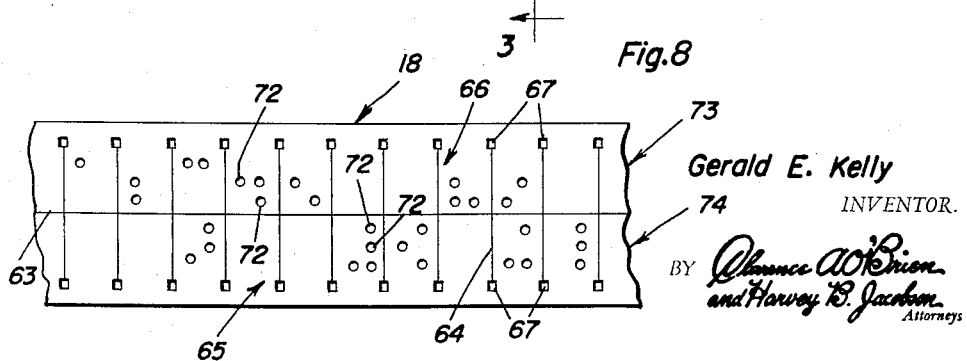
Fig. 8 is a fragmentary plan view of a portion of the special or prefabricated film or tape.

The film or tape is shown in detail in Fig. 8 and, as before mentioned, is preferably an 8 mm. film suitably marked by lines 63 and 64 to define individual frames or reading areas, the bottom frames being denoted at 65 and the top ones at 66. The apertures along the edges are sprocket holes 67, these being adapted to cooperate with the two sprockets or sprocket wheels 68 and 69 shown supported on the rectangular elevated forward portion 70 of the case. The numerals 71 designate suitable film retaining guides cooperable with the film on the sprocket wheels. The sprocket holes 67 have another purpose to be later described. As is perhaps clear, the frames or areas 65 and 66 are prepunched. That is to say, a series of properly arranged apertures or holes are provided and these are all designated by the numerals 72. Thus, the means for housing the motor, reels and transmitting motion from the motor to the reels and the way in which the reels are accessible has been covered. By opening the top door 58 it is possible to move and change the reels so that the same tape can be returned in an opposite direction from that illustrated to bring into play the upper half 73 of the tape as distinguished from the lower half 74.

Figure 4:
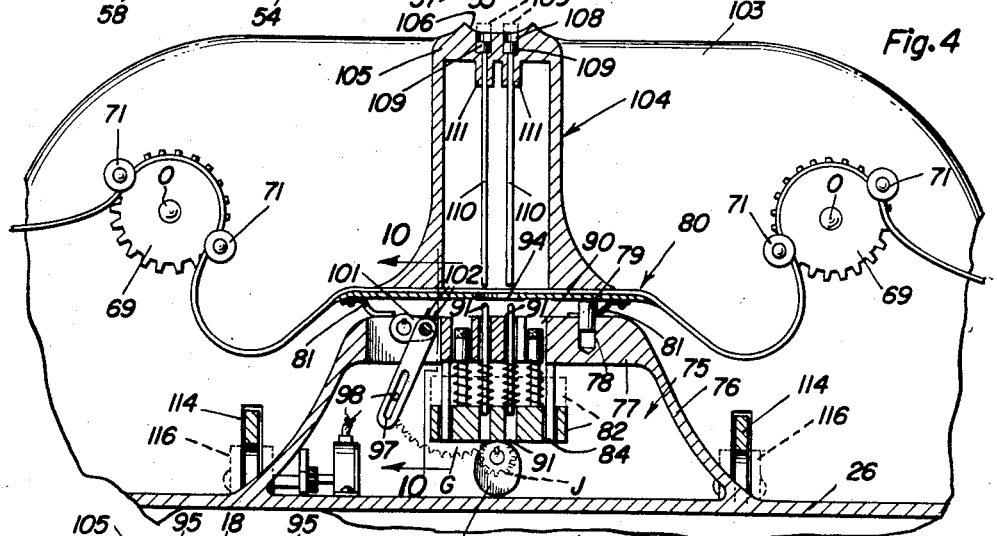
Fig. 4 is a view showing what may be said to be the essence of the invention and taken on the vertical line 4—4 of Fig. 3.
Figure 10:
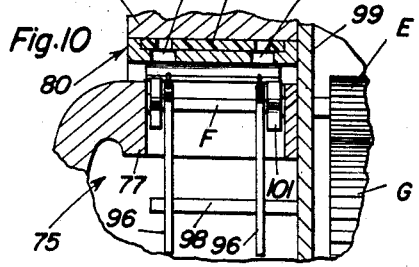
Fig. 10 is an enlarged fragmentary view in section and elevation showing the crank operated means which is proposed to be used in intermittently moving or feeding the film step-by-step.
Figure 5:
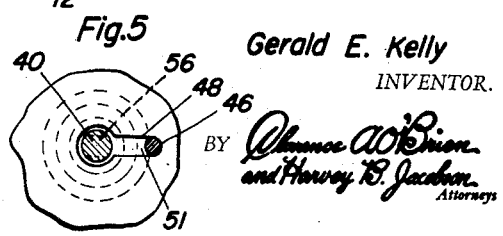
Fig. 5 is a detail horizontal section on the line 5—5 of Fig. 3.

Reference may be made now to Figs. 3, 4 and 7. In Fig. 4 the hollow mound-like portion 75 constitutes an elevated base 76. The horizontal top portion 77 of the base is here referred to as a stationary bed or plate. There are sockets 78 therein to accommodate assembling and guide studs 79 on the underneath side of the spring pressed horizontal platen 80. The leaf-type springs 81 are fastened to the underside of the platen and rest on the bed as shown. In the hollow or chamber portion 76, there is a presser foot which here takes the form of a rectangular block 82, and this has holes 83 therein (Fig. 7) which receive guide and stabilizing pins 84 depending from the bed plate 77. These pins coordinate the presser foot or block with the bed plate causing the same to travel in a true vertical line up and down as denoted in dotted and full lines in Fig. 4. The block is systematically raised and lowered by way of a cam 85 on a cam shaft J to be hereinafter referred to. Guide studs 86 are fixed to the upper respective end portions of the block and are provided with sliding caps 87 on their upper ends which are spring elevated by coil springs 88. These caps are provided with buffers or compressible buttons 89 on their upper ends. It will be noted that these caps slide or reciprocate in guide openings 90 provided therefor in the bed plate 77 as seen in Fig. 4. The bed plate is also provided with centrally disposed holes which register with corresponding holes 91 in the block 82. These respective sets of holes serve to accommodate the plunger rods which are six in number as seen in Fig. 7 and which are in properly ordered relationship, said plunger rods being denoted by the numerals 91. These rods are surrounded by coiled expansion springs 92 which are interposed between the block and the bed 77 in the manner shown in Fig. 4. The platen 80 as perhaps best shown in Fig. 7, is channel-shaped in cross-section and the marginal walls 93 serve to properly guide and confine the film or tape. The central portion of the platen has a suitable opening 94 therein to allow for passage of the upper tips or ends of the springs biased plunger rods 91. There are also spaced parallel slots 95 at the left hand end of the platen to accommodate mechanical means which is employed to move the tape a step at a time. This means is shown in Fig. 10 and comprises a pair of spaced parallel links 96 having elongated slots 97 at their lower ends linked to a keying rod 98 projecting from the gear box wall 99. Incidentally, the gear box is denoted by the numeral 100 and is seen in Fig. 3. The upper ends of the links 96 are pivotally joined to cranks 101 on a crank shaft F which will be again referred to. The upper ends of the links are provided with spaced pairs of upstanding tracking fingers 102 and these fingers are arranged to engage in the aforementioned sprocket holes 67 along the longitudinal edges of the tape 73 so that by timing the operation of the crank shaft through the gearing to be described the crank shaft and links serve to feed the tape across the platen or table 80 in a step-by-step manner.

Incorporated in the case and suitably shaped and located at the center of the front portion 103 is the part referred to previously as an upstanding hollow pedestal or post 104. The base part of this is spaced above the platen and the bed plate 77 so that there is an existing slot between the two stationary parts to accommodate a spring elevated action of the platen and also to allow the platen to be depressed against the tension of the springs 81 to permit the film to be inserted and removed.

The upper head portion (Fig. 4) 105 of this column is shaped to provide the aforementioned finger rest 106. This finger rest is dished or recessed so as to conformably seat the finger which is used in translating the information furnished the reader by way of the pads which are about to be described. Arranged suitably in the surface 107 (Fig. 1) of the finger rest, the observer will notice six holes 108. These holes are actually small sockets which are seen in Fig. 4 serve to accommodate buttonlike pads 109 on the upper ends of the feeler rods 110. These feeler rods are arranged in a bank of six and are properly lined up with their respective holes or sockets 108. The upper end portions of the rods 110 pass through and slide up and down in the guide necks 111 and the lower end portions drop down under the forces of gravity and reside normally in a plane just above the opening 94 in the platen. Manifestly, these six pins or rods 110 align with their respective spring biased plunger rods 91. In other words, there is one plunger 91 for each pin or feeler rod 110. The normal relationship of the plunger rods 91, feeler rods 110 and their alignment with each other and the opening 94 in the platen 80, plungers and pins is seen in full lines in Fig. 4 wherein the cam actuated block or presser foot 82 is in a down position. Manifestly, when the cam 85 turns around and forces the block up to the dotted line position shown, the plunger rods 91 are gradually lifted and the springs 92 (Fig. 7) are compressed. Depending on the associated Braille-representing-apertures 72 in the film or tape 73 one or more rods comes into play with the result that the directly cooperable feeler rods above the moving tape are either elevated or lowered as the case may be. In the full line showing the pads 109 are seen in receding position, whereas in dotted lines the pads are projected a fraction of an inch above the finger seating surface 107.

With reference now to Fig. 7 the motor speed control bar resembling a space bar on a typewriter is denoted by the numeral 112. This is attached to lateral arms 114 whose free ends are pivotally supported in bearing lugs 116. The arm at the left is provided with a rocker shaft 118 carrying a fan-shaped or sector gear 120 meshing with a pinion 122 on a shaft 124 which controls the operation of a suitable rheostat 126. Thus, the speed of the motor by way of this manually actuatable bar 112 and its components by way, of course, of the rheostat is obtained.

It would appear that the manner in which the power is derived or the motion is transmitted from the motor to the various parts is reasonably well clear from the drawing itself. However, and with reference to Fig. 6, it may be pointed out that the aforementioned gear box 100 contains the preferred arrangement of gearing which serves to operate the various parts. It is perhaps unnecessary to dwell at length on this gearing other than to say that the gear A at the center is in mesh with the rest of the train of gears and the latter gears are merely differentiated in alphabetical order so that the motion to the left and right of the gear A is substantially self-evident. For the example, the gears N drive the sprocket wheels P by way of the connecting shaft O. By way of gears A, B, C and E the gear G is driven to operate the shaft H which as seen in Fig. 7 drives the crank shaft which controls or operates the links 96. The gear I and shaft J serve to operate the cam 85. The gear I is in mesh with the gear G in the manner shown. Also, the rheostat and controller gearing therefor is, more or less, conventional and is not specifically claimed and, therefore, not to be dwelled upon here. In connection with the crank shaft means 96, 97 and 101, the slots 97 are sufficiently long in relation to the support pin 98 for the crank for a complete revolution. As the shaft means turns counterclockwise, the crank will raise the links up giving the fingers 102 necessary engagement with the holes in the film pulling it across when it is about 180° from the drawn position the pins will be disengaged from the film as is obvious. It is evident to this applicant that the gear ratios and perhaps other mechanical expedients and motion transmitting means can be improved upon but as stated, these old parts are not to be specifically claimed herein. The matter of sprockets for feeding a film being much the same as that employed in motion picture machines is, of course, not claimed.

It will be evident that the running of the tape or film through this machine is very similar to that of a motion picture machine, the film being moved exactly one frame and stopped by the intermittent or ratchet and pawl means and it is then that the information on the film, as it were, is transferred to the feeler pins and pads by way of the cam operated presser foot and plunger means cooperable therewith all as has been sufficiently covered, as the description has progressed and as is further evident from a consideration of Figs. 3, 4 and 7 of the accompanying drawings. In these circumstances, a more extensive description is believed to be unnecessary.

Minor changes in shape, size, materials, and rearrangement of components may be resorted to in actual practice without departing from the spirit of the invention or the invention as covered in the subjoined claims.

What is claimed as new is as follows:

1. A Braille reader for the blind comprising a machine having an upstanding pedestal provided at its top with a readily available unobstructed finger rest having a stationary surface provided with holes, a bank of individual projectible and retractible feeler pins confined and mounted for operation in said pedestal, the upper ends of said pins having finger contacting member normally receding into the holes and capable of being elevated a fraction of an inch above said surface, said members being usable singly and collectively to present Braille indicia to the user's finger, and manually regulable and controllable means and mechanism for raising and lowering said feeler pins, said means embodying, among its components, a platen located beneath the feeler pins, a perforated tape movable over the platen, power operated sprocket wheels for delivering and moving the tape across the platen, mechanical means for progressively moving the tape one frame or step at a time, a bank of spring-loaded plungers adapted to be held in an inactive ready-to-function state by cooperating imperforate portions of the tape, the apertures in said tape serving to actuate the feeler pins in a manner predetermined by the tape's functioning.

2. The structure defined in claim 1, and wherein tape is provided with prepunched and arranged apertures registrable with the plungers at each cycle of operation of the tape, whereby the plungers are either released or retained in keeping with the need to bring the feeler pins, singly or collectively, into play.

3. The structure defined in claim 1, and wherein the stated means and mechanism also embodies power operated gearing imparting motion to a crank shaft having at least one link provided with progressively and intermittently actuable fingers engageable releasably with sprocket openings provided therefor in said tape in a manner to move the tape over the platen in the desired step-by-step manner.

4. A Braille reader for the blind comprising a portable machine embodying a case having a base the horizontal top portion of which constitutes a bed, a hollow pedestal fixed vertically in a portion above said bed, the bottom of said pedestal being disposed in spaced parallelism above said bed and defining a film slot between the top of the bed and said pedestal bottom, a channeled platen located in said slot and spring-biased against said pedestal bottom, a prepared film confined in the channel and movable over the platen, sprocket means for moving and delivering the film, power operated means carried by said bed for moving the film a frame at a time, the upper part of said pedestal having a finger rest with feeler pin holes therein, a bank of gravity lowered feeler pins mounted for controlled projectible and retractible operation in said pedestal, the upper ends of said pins having finger contact pads normally situated below the surface of said finger rest, said pads being adapted to rise, singly or collectively, a fraction of an inch above the surface in a manner to be fingered and read individually or in varying combination groups, the lower ends of said pins being disposed in operable position just above the plane of a hole in the platen, a presser block mounted for operation in said base, guide means cooperatively connecting said block with said bed, and a bank of spring-equipped plunger rods carried by said block and operable through passages provided therefor in said bed, said plunger rods having their respective upper ends aligned for thrust engagement with the cooperating aligned and respective lower ends of said feeler pins.

5. A Braille reader for the blind comprising a portable machine adapted to be controlled and operated by the user thereof and comprising a portable case embodying a magazine for film reels, a motor housing mounted atop and aligned with the magazine, an electric motor supported in said motor housing, shaft means cooperable with the motor and a bearing provided therefor in said magazine to operate film reels when in operative position in said magazine, the forward central portion of said motor housing having a vertical wall embodying a hollow vertical portion constituting a pedestal, a portion of the horizontal top wall of the magazine between the bottom of the pedestal and the underlying magazine top wall being provided with a hollow upstanding base, the top portion of the base providing a bed and said bed being spaced below a cooperating bottom portion of the pedestal and defining a film slot between the top of the bed and the bottom portion of the pedestal, a yieldingly supported platen located in the slot and spring-biased against the bottom of the pedestal, said platen having a central opening, a specially prepared film having a portion adapted to operate in a direction toward the right or direction toward the left across the film accommodating surface of the platen, means for imparting motion to the film, a plurality of gravity lowered feeler rods mounted for controlled projectible and retractible operation in said pedestal, upper end portions of said rods having finger contacting portions operable through holes provided therefor in the top of the pedestal, said pedestal top providing a finger rest, the lower ends of said rods being disposed in operating position above the plane of the platen and in alignment with the opening in the platen, the film moving on said platen preventing the lower ends of the rods from dropping down through the opening in the platen, said platen having associated Braille representing apertures cooperable with said rods, a bank of spring-equipped plunger rods mounted for operation in the base, said plunger rods having their respective upper ends aligned for thrust engagement with cooperating aligned lower end portions of the feeler rods and therefore located in alignment with the opening in said platen.

References Cited in the file of this patent

UNITED STATES PATENTS

| | | |
|---|---|---|
| 627,526 | Prestwich | June 27, 1899 |
| 934,242 | Urban | Sept. 14, 1909 |
| 1,178,991 | Brown | Apr. 11, 1916 |
| 1,217,598 | Heinze | Feb. 27, 1917 |
| 2,828,367 | Sibbet | Mar. 25, 1958 |

FOREIGN PATENTS

| | | |
|---|---|---|
| 1,018,369 | France | Oct. 15, 1952 |